US008267692B2

(12) United States Patent
Doering

(10) Patent No.: US 8,267,692 B2

(45) Date of Patent: Sep. 18, 2012

(54) METHOD FOR CREATING AN ARTISTIC WORK INCORPORATING A BASIC SYMBOL FORM SET BASED ON A CIRCULAR OBJECT AND MOVEMENTS THEREOF

(76) Inventor: Deborah Adams Doering, Chicago, IL (US)

( * ) Notice: Subject to any disclaimer, the term of this patent is extended or adjusted under 35 U.S.C. 154(b) by 532 days.

(21) Appl. No.: 12/480,025

(22) Filed: Jun. 8, 2009

(65) Prior Publication Data

US 2010/0311302 A1 Dec. 9, 2010

(51) Int. Cl.
*G09B 11/00* (2006.01)

(52) U.S. Cl. .......................................................... 434/81

(58) Field of Classification Search .................... 434/81, 434/82, 84, 85, 89, 90, 96; 248/317, 489; 428/7, 67

See application file for complete search history.

(56) References Cited

U.S. PATENT DOCUMENTS 3,876,080 A * 4/1975 Hultberg et al. ........... 211/105.5
4,214,808 A * 7/1980 Hampson ...................... 359/616
D263,065 S 2/1982 Matsui
D316,059 S 4/1991 Wieman et al.
5,290,001 A * 3/1994 Jones ............................ 248/318
5,324,224 A * 6/1994 Anderson et al. ............... 446/91
5,620,274 A * 4/1997 Wear ............................. 403/171
5,964,263 A 10/1999 Nelson
6,176,705 B1 * 1/2001 Garvey et al. ................. 434/284
D449,792 S 10/2001 Nadeau et al.
6,540,381 B1 * 4/2003 Douglass, II ............ 362/311.09
D478,022 S 8/2003 Pankretz
6,740,458 B1 5/2004 D'Offay
6,820,853 B1 * 11/2004 DuBarry ....................... 248/489
6,832,944 B2 * 12/2004 Ostrow .......................... 446/236
6,958,869 B2 * 10/2005 Monastiere ................... 359/819
D566,000 S * 4/2008 Chan ............................ D11/141
D571,253 S 6/2008 Cavness
7,418,900 B2 9/2008 Fields et al.
7,629,400 B2 12/2009 Iiyman
2003/0035917 A1 * 2/2003 Hyman ........................... 428/67
2009/0184226 A1 * 7/2009 Clark et al. ................... 248/340

* cited by examiner

*Primary Examiner* — Kurt Fernstrom

(74) *Attorney, Agent, or Firm* — Nixon Peabody LLP

(57) ABSTRACT

A method of using a collection of symbols based on the movement of a circular object in space on three-dimensional and two-dimensional art works. The method relates to orienting a circular object at different angles and to trace the path of the circular object to create basic symbols. The basic objects are incorporated in a three-dimensional sculpture including surfaces and circular objects suspended at relative heights and orientations according to the collection of symbols.

7 Claims, 9 Drawing Sheets

METHOD FOR CREATING AN ARTISTIC WORK INCORPORATING A BASIC SYMBOL FORM SET BASED ON A CIRCULAR OBJECT AND MOVEMENTS THEREOF

FIELD OF THE INVENTION

The present invention relates generally to methods of creating artistic works, and, in particular, to a method of creating artistic works incorporating a basic symbol set derived from the movement of a circular object.

BACKGROUND OF THE INVENTION

As is well known, sculptures are three-dimensional aesthetic works while two-dimensional works such as drawings or paintings are two-dimensional aesthetic works. Artists seek to create both three-dimensional and two-dimensional works that can incorporate common themes that offer commentary, create visual interest for as well as invite participation by viewers. Artists seek to conceive of a system of common themes which may be recognizable for such works by a viewer. Such common themes need to distinctive yet be relatable and comprehendible to both the work and the viewer. It is useful to use symbols and forms that may be translated both in three-dimensional mediums such as sculptures or two-dimensional mediums such as drawings, paintings or prints.

What is needed is a process that can produce a distinct collection of forms and symbols for art works that represents a flow of movement of a basic shape and allows symbolism, representing a distinct visual system of artistic thought, to be incorporated in different works of art in both two and three-dimensional mediums.

SUMMARY OF THE INVENTION

Aspects of the various embodiments disclosed herein relate to a method for creating a distinct visual system of artistic thought in a unique sculpture and a unique edition of prints. One example is a method for creating a three-dimensional artistic work having at least one flat surface and a ceiling area. A wall with the flat surface is mounted. A grid is located from the ceiling area in a perpendicular plane relative to the flat surface. A series of circular objects are hung from the intersections of the grid in relation to the flat surface at different heights and relative rotations according to a pattern of symbols based on the rotation of the circular symbols relative to vertical and horizontal axis along a path.

Another example is a method of creating a two-dimensional artistic work based on the movement of a circular object. Symbols are selected from a collection of symbols representing the movement of the circular object. The collection of symbols includes a horizontal line symbol, a vertical line symbol, a zero symbol and a tilde symbol. The collection of symbols is rendered on a two-dimensional medium.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
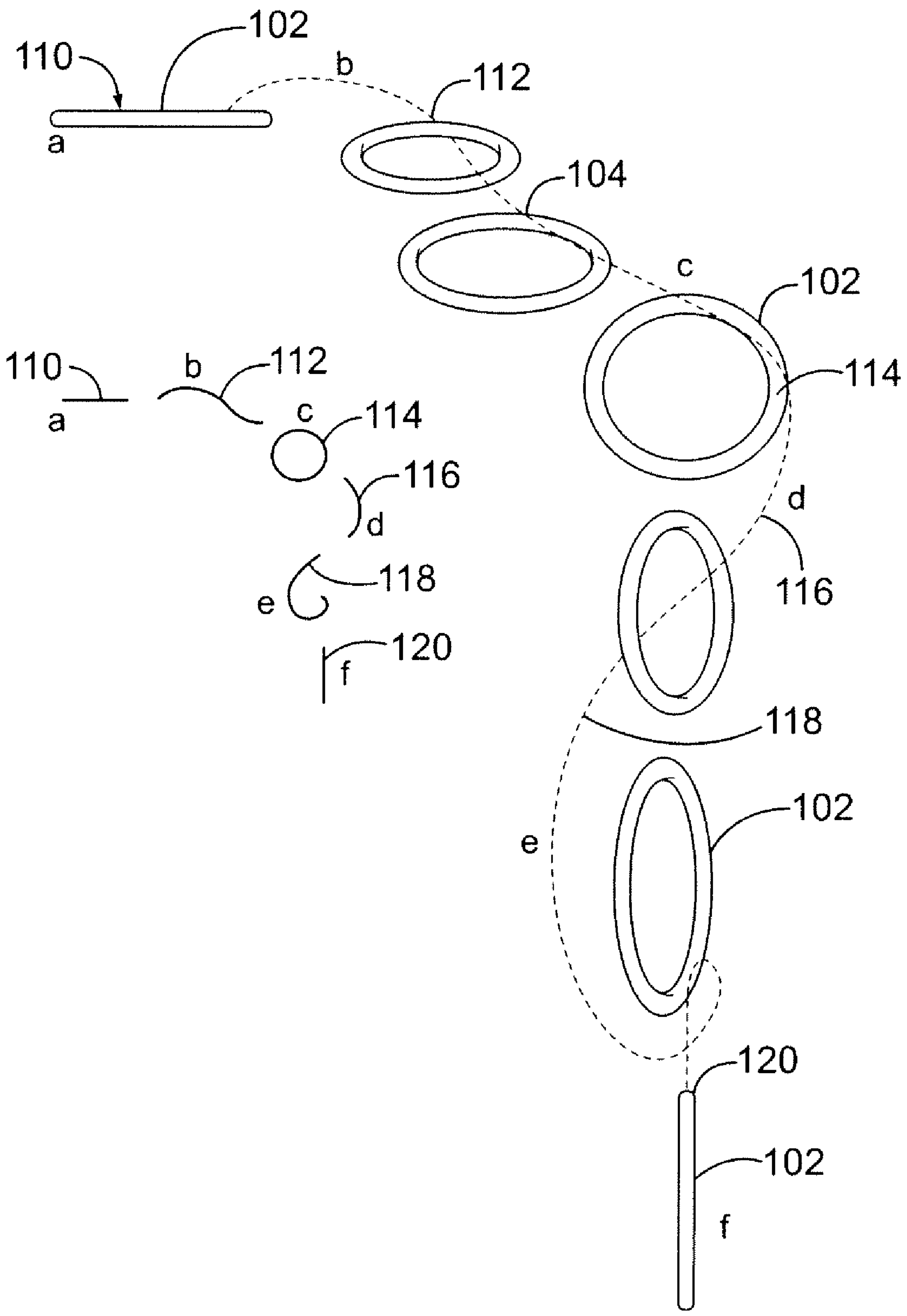
FIG. 1 is drawing of various paths and rotations of a circular object that may be used to create a set of different symbols that are the basis of the process of creating an artistic work.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to FIG. 1, a series of movements of a circular object 102 along a path 104 (dashed line) is shown. The circular object 102 is oriented in different positions flowing in the movement path 104 shown in FIG. 1. A first position of the circular object 102 produces a first horizontal line basic symbol 110. A first part of the path 104 produces a second basic horizontal tilde symbol 112. A second position of the circular object 102 produces a third basic circle symbol 114 as a circle representing a zero. The first part of the path 104 represents the angular rotation of the circular object 102 about a horizontal axis between the first position represented by the horizontal line basic symbol 110 and the basic circle or zero symbol 114. A second part of the path 104 produces a fourth basic arc symbol 116. A third part of the path 104 produces a fifth basic vertical tilde symbol 118. A final position shows the circular object 102 that is entirely at a 90 degree angle representing a vertical line or one symbol 120. The parts of the path 104 between the third basic circle symbol 114 and the one symbol 120 represent the rotation of the circular object 102 on a vertical axis. The progression of the circular objects 102 along the path 104 therefore provide the basic collection of symbols 110, 112, 114, 116, 118 and 120 which may be incorporated into artistic works such as three-dimensional sculptures or two-dimensional drawings.

The movement shown in FIG. 1 represents the movement between dual states such as zero and one or on and off. The four basic symbols of a collection of symbols include the position of the circular object 102 in the horizontal line basic symbol 110, the zero symbol 114 and the vertical line or one symbol 120 and the tilde symbol such as the tilde symbol 112 in FIG. 1. The four basic symbols 110, 112, 114 and 120 are short handed code of the positions of the movement of the circular object 102 in space along the path 104. The movement creates the other symbols 112, 114 and 118 which are a swash or a tilde shape representing parts of the path 104. The basic marks 110, 112, 114, 120, 118 and 120 are a method to show the movement of the circular object 102 in space and form the core of the collection of symbols for different sculptures and the relationship of the symbols which are part of the uniform theme described above. The circular object 102 is thus the center of the common theme that may be readily recognized by a viewer.

Figure 2:
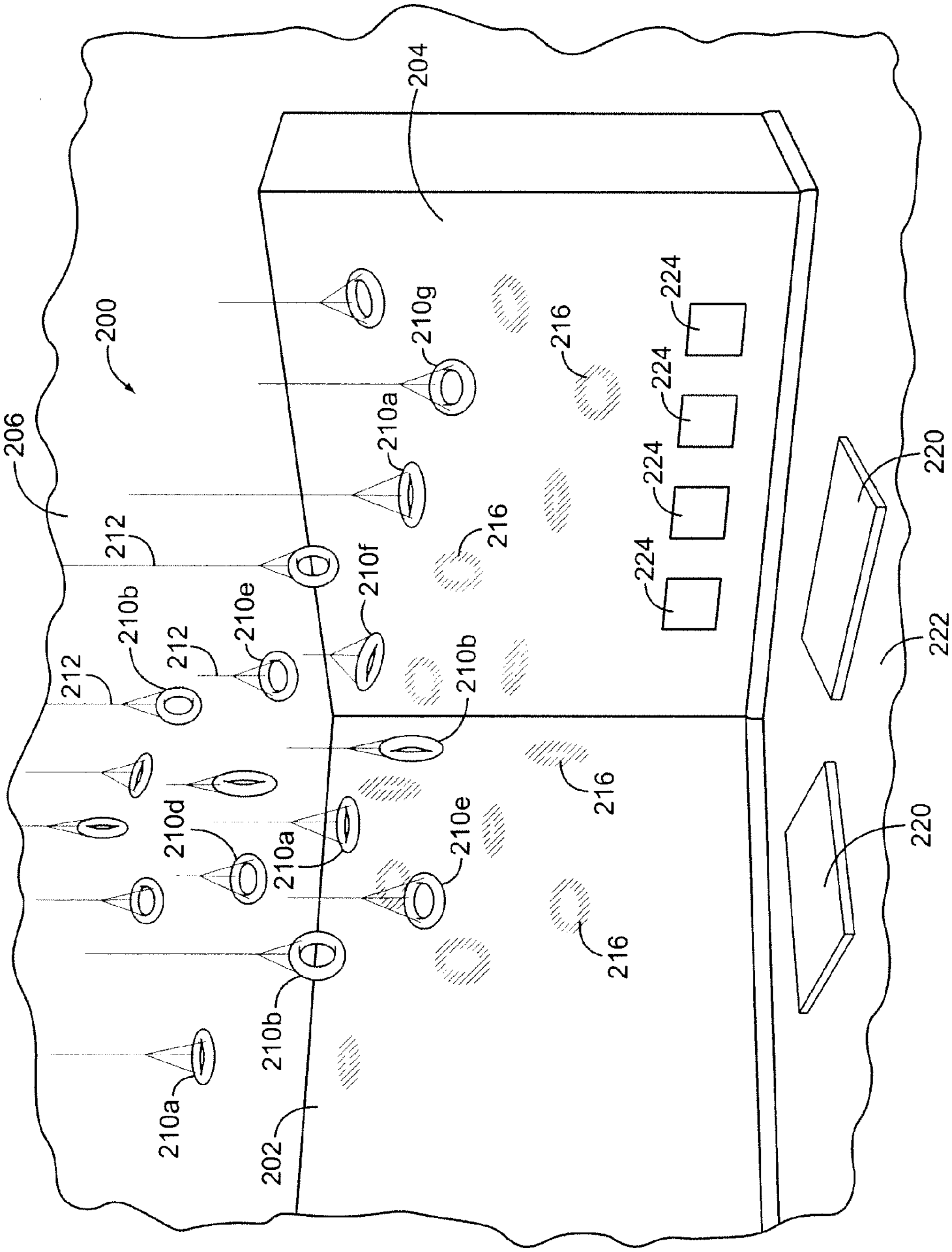
FIG. 2 is a side perspective view of a three-dimensional artistic work incorporating the symbols from the circular objects.

FIG. 2 is a perspective view of a three-dimensional sculpture 200 that incorporates the symbols shown in FIG. 1. The three-dimensional sculpture 200 is in a closed room (not shown), but the use of the basic symbols in FIG. 1 may be applied any three-dimensional elements. These may include works in designated public or private space. The three-dimensional sculpture 200 includes a first vertical flat wall 202 having a flat surface and a second vertical flat wall 204 having a flat surface. The vertical walls 202 and 204 may be painted different colors or have the same color to complement the surrounding areas. Preferably the colors of the vertical walls 202 and 204 have a uniform and light shade to allow shadows to be seen easily. A ceiling 206 is provided with a grid 208 that includes horizontal and vertical wires that intersect at various intersection points. The sculpture 200 includes a series of suspended circular objects 210*a-g* which may be shown in FIG. 3. The various circular objects 210*a-g* are suspended by corresponding wires 212 attached to the ceiling 206 at various points defined by the intersection points of the grid 208. Each of the circular objects 210*a-g* is suspended at different heights and at different orientations via the corresponding wires 212. The circular objects 210*a-g* are fixed in orientation via the wires 212 by attaching the wires 212 in one, two, three, or four points to the corresponding circular objects 210*a-g*. Three and four point wire attachments allow the greatest maneuverability in terms of positioning the circular objects 210*a-g* to conform to the symbols shown in FIG. 1. The circular objects 210*a-g* create shadows 216 on the first vertical flat wall 202 and the second vertical flat wall 204 based on a light source which in this example is the natural lighting of the display room or space (not shown). Of course artificial lighting may be provided in relation to the walls 202 and 204 and the circular objects 210*a-g* to create additional desired shadows on the walls 202 and 204. The orientation of the circular objects 210*a-g* represent the movement of the object 102 according to the collection of symbols shown in FIG. 1. The shadows 216 projected on the walls 202 and 204 also represent the collection of symbols shown in FIG. 1.

The sculpture 200 invites viewers to participate in the installation by sitting or laying down on mats and cushions 220 provided on the floor space 222 between the first and second vertical walls 202 and 204. As shown in the view in FIG. 3, this allows viewers to change their perspective and view the suspended circular objects 210*a-g* and their relationship to the forms and to the space around them from an unusual perspective. The different suspended heights and orientations of the circular objects 210*a-g* from the ceiling 206 allows the viewer to observe shapes of the symbol set shown in FIG. 1 that represent a common theme constituting the sculpture 200. Additional two-dimensional artistic works 224 may be mounted on the flat surfaces of one or both of the walls 202 and 204.

Figure 3:
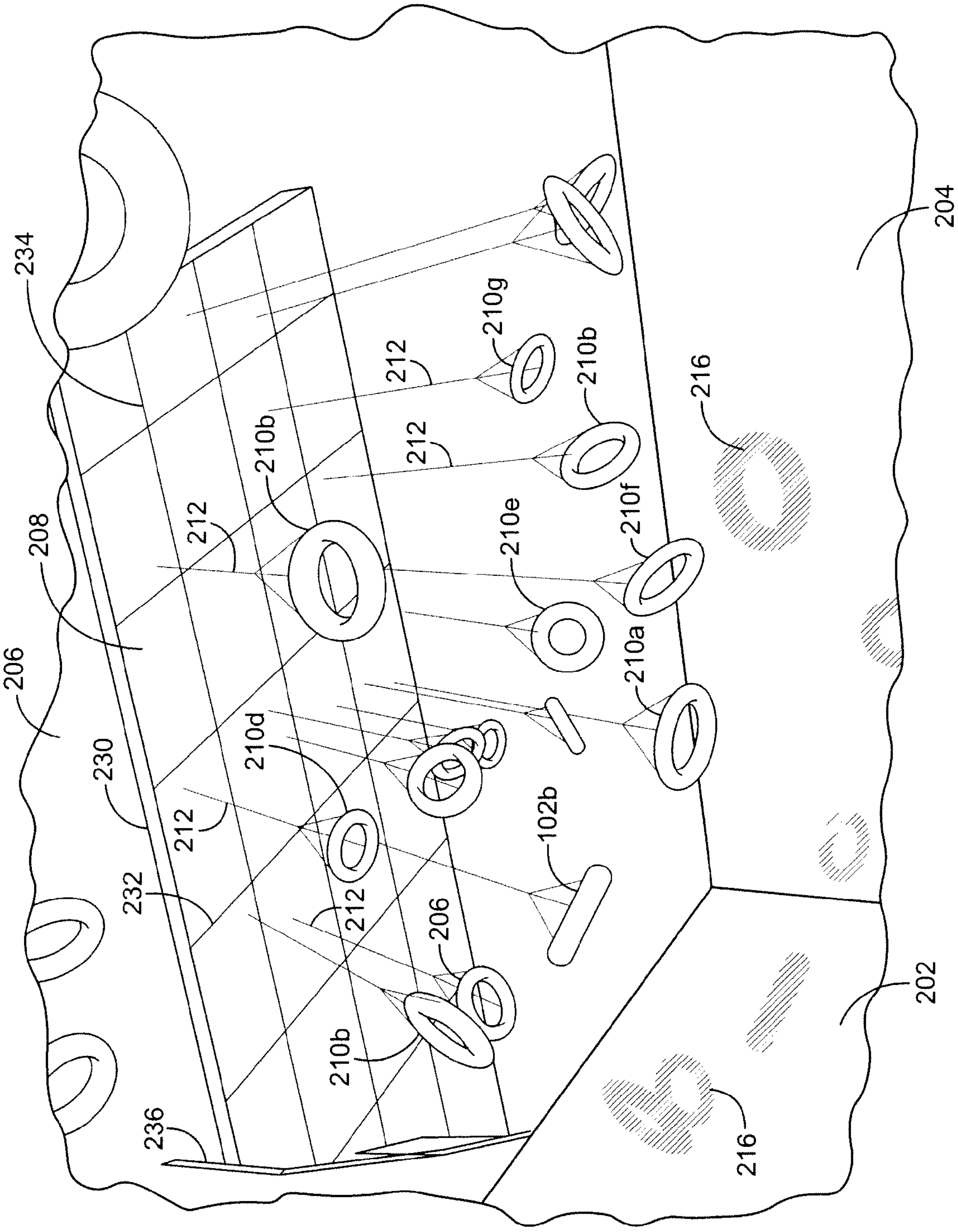
FIG. 3 is a perspective view of the various heights and orientations of the circular objects of the three-dimensional artistic work in FIG. 2.

As shown in FIG. 3, the grid 208 includes a rectangular frame 230. The frame 230 includes a series of intersecting lines 232 and 234 that are perpendicular to each other. The lines 232 and 234 in this example are thin wire. The wires 212 hanging the circular objects 210*a-g* are attached to the intersections of the lines 232 and 234. The frame 230 is suspended from the ceiling 206 via guide members 236.

Figure 4A:
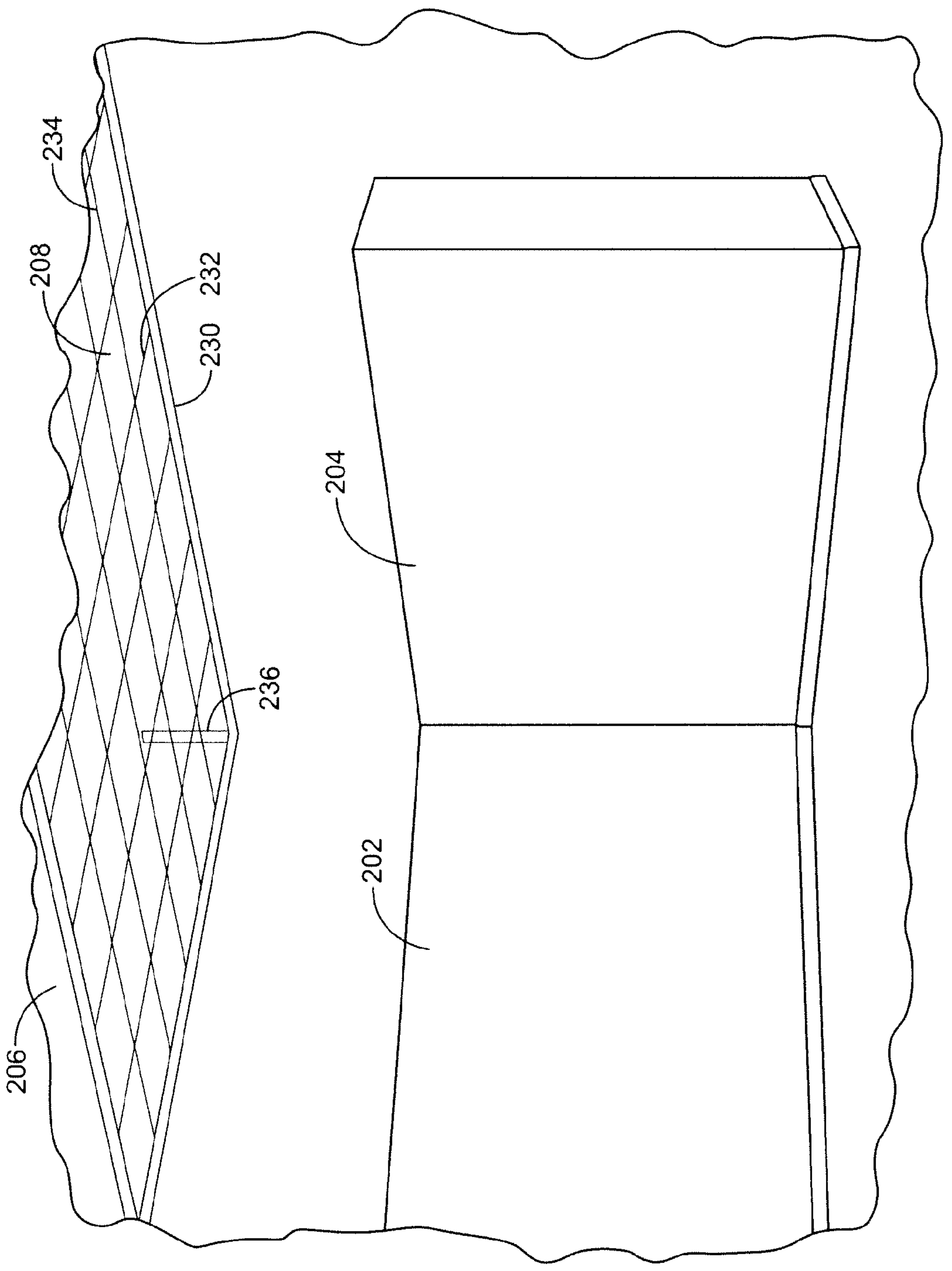
FIGS. 4A-4D are perspective views of the process of placing different circular objects to create the artistic work of FIG. 2.

FIGS. 4A-4D show the process by which the sculpture 200 in FIGS. 2 and 3 is constructed. FIG. 4A shows the set up of the two vertical walls 202 and 204 which may alternatively constitute any flat surface. The initial grid 208 is then suspended from the ceiling 206 or alternatively directly attached to the ceiling 206. The grid 208 is set up to space the circular objects 210*a-g* to create a sufficient number of shadows to represent the flowing and movement of the circular objects according to the symbol set shown in FIG. 1. The circular objects 210*a-g* may be created from any available material such as paper, wood, glass, metal and fiber. Although, the number of circular objects 210*a-g* is fixed in this example, any appropriate number of circular objects 102 may be used to create the sculpture 200. The circular objects 210*a-g* are fabricated to be identical in this example, although differing sizes of the circular objects may be used. The circular objects 102*a-g* are finished with a coating such as paint as desired to provide a contrast or compliment with the color of the vertical walls 202 and 204. The circular objects 210*a-g* are finished prior to the mounting in relation to the ceiling 206.

Figure 4B:
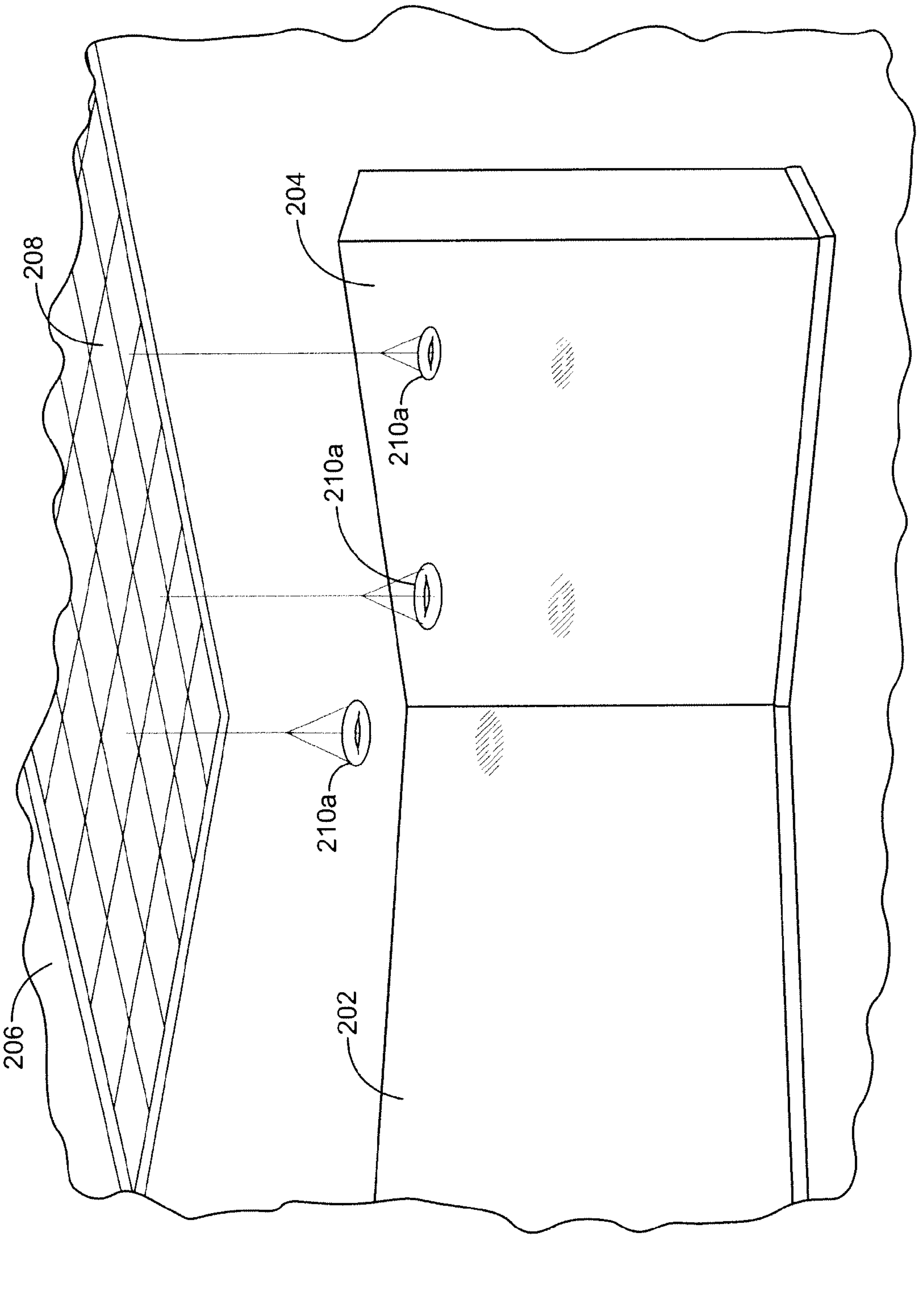
Figure 4C:
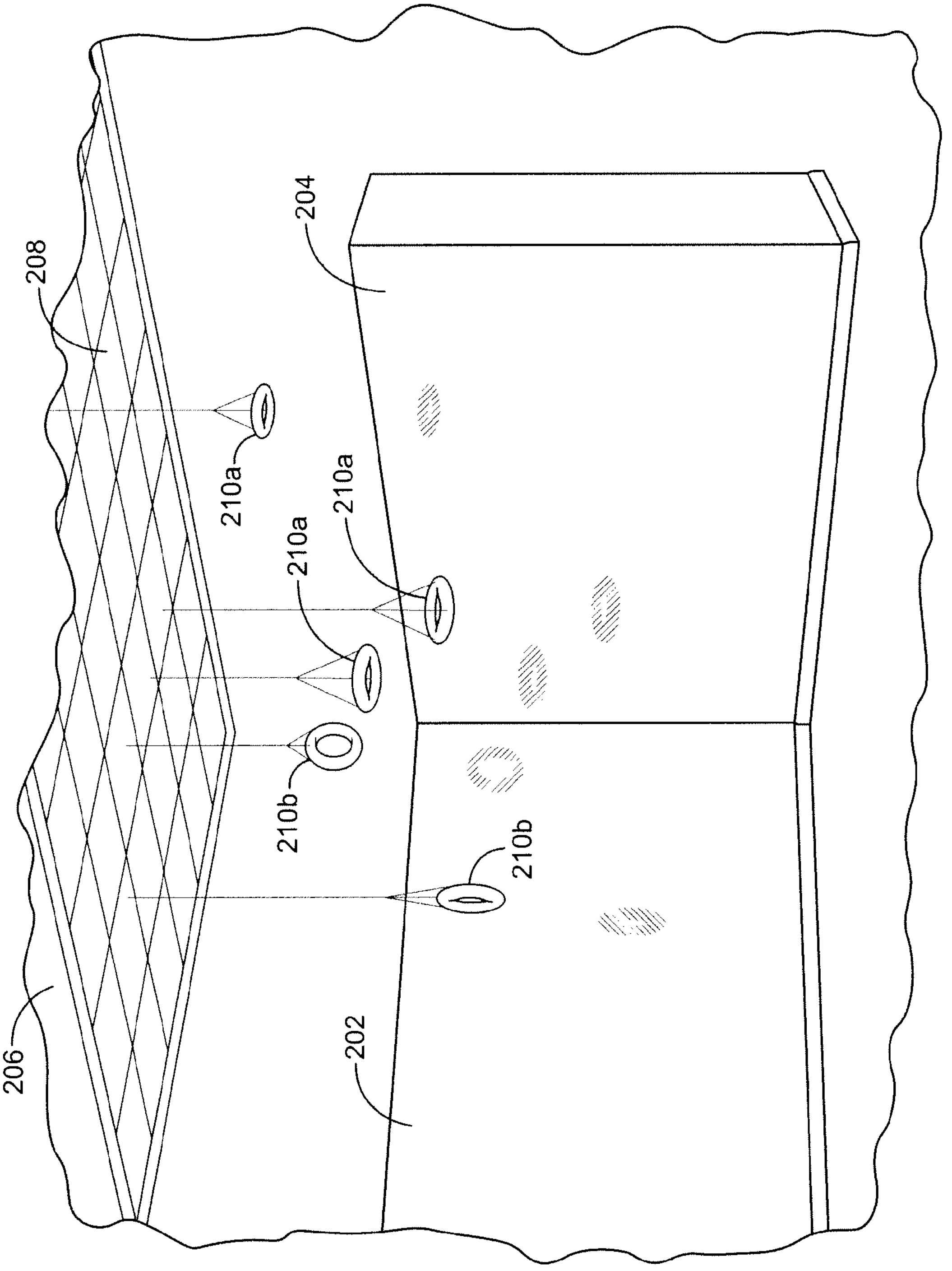
Figure 4D:
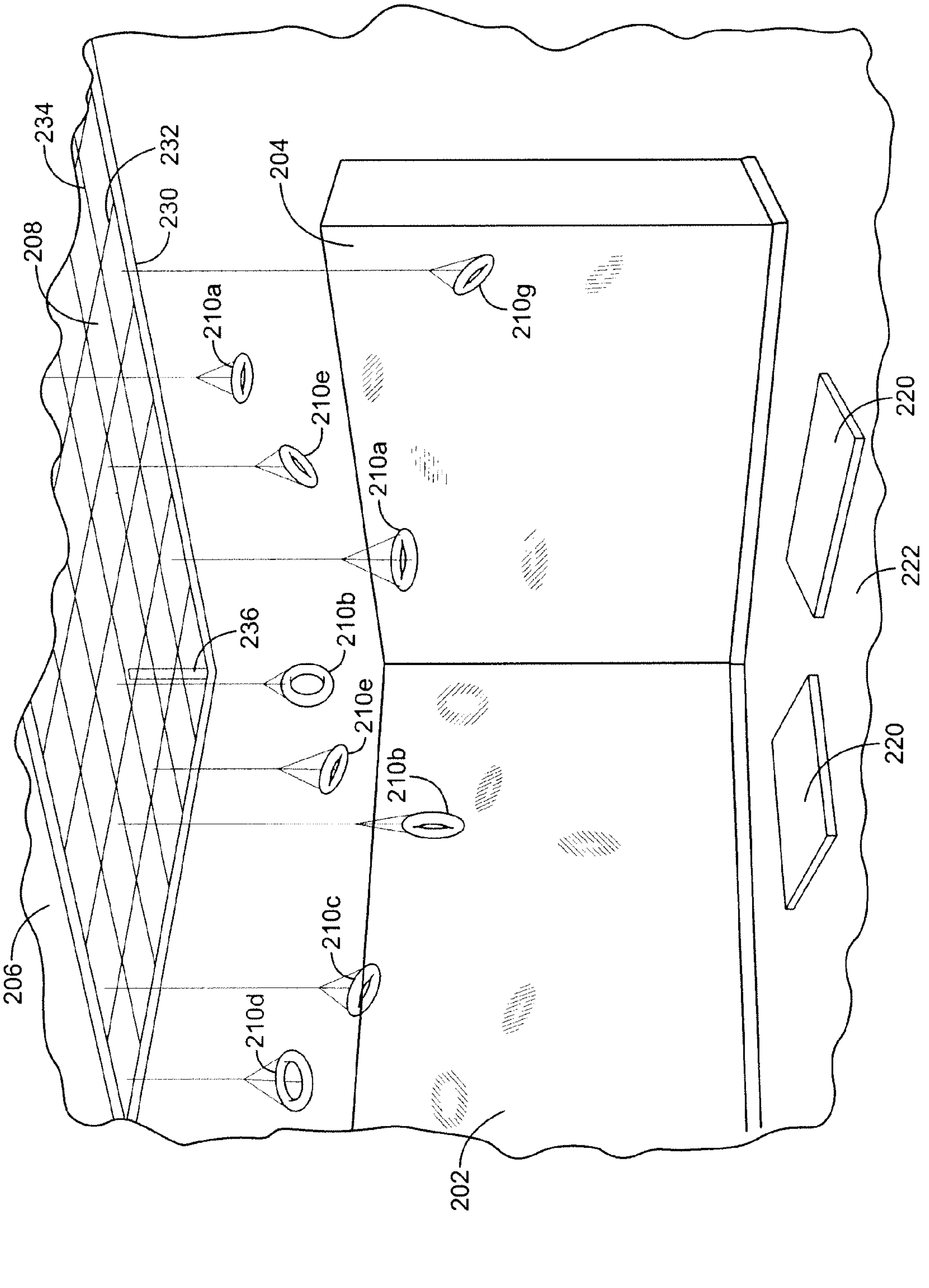

The circular objects 210*a-g* are then suspended at different points in the grid 208 as shown in FIGS. 4B-4D. In this example, the wires 212 are a very thin, nearly invisible fish-wire attached to each circular object 210*a-b*. The wires 212 are attached to the intersecting points on the grid 208 by tying the end that is not attached to the respective circular object 210*a-g* to the intersecting horizontal and vertical points of the grid; or, when necessary to create the proper relationships between the circular objects and the shadows on the walls, by tying the end to a point on the grid 208 other than an intersecting point. Of course other types of attachment devices may be used to suspend the wires 212. The length of the wires 212 are determined in order to suspend the corresponding circular objects 210*a-g* at different heights relative to the two walls 202 and 204. The circular objects 210*a-g* are also fixed in rotational position relative to the walls 202 and 204. FIG. 4B shows an initial set of circular objects 210*a* that are suspended in an upright position. The initial set of circular objects 210*a* are suspended and oriented to create the zero symbol as shown in FIG. 1. FIG. 4C shows a second set of circular objects 210*b* that are positioned horizontally and in relation on the grid 206 to the initial set of circular objects 210*b*. The second set of circular objects 210*b* therefore are positioned to be seen as the horizontal line symbol in FIG. 1.

FIG. 4D shows a third set of circular objects 210*c-g* is suspended vertically and in perpendicular relation to the first and second set of circular objects 210*a* and 210*b*. The third set of objects 210*c-g* form the third group of symbols representing the movement of the circular objects in FIG. 1. Each of the additional circular objects 210*c-g* are tilted relative to the ceiling 206 to document movement of the circular form in FIG. 1 between the positions represented by the first, and second sets of circular objects 210*a-b*. The positioning of the various circular objects 210*a-g* relative to each other are selected in a manner to represent the basic symbol set in FIG. 1 and provide the shadows 216 shown in FIGS. 2 and 3. Further, the additional circular objects 210*c-g* represent the path 104 shown in FIG. 1. In this particular rendition of the sculpture, the two custom mats 220 are placed in the delineated space, below the circular objects 210*a-g*, to provide an area for viewers to lay down and view the circular objects 210*a-g* and shadows 216 from a unique perspective as shown in FIG. 3.

Figure 5A:
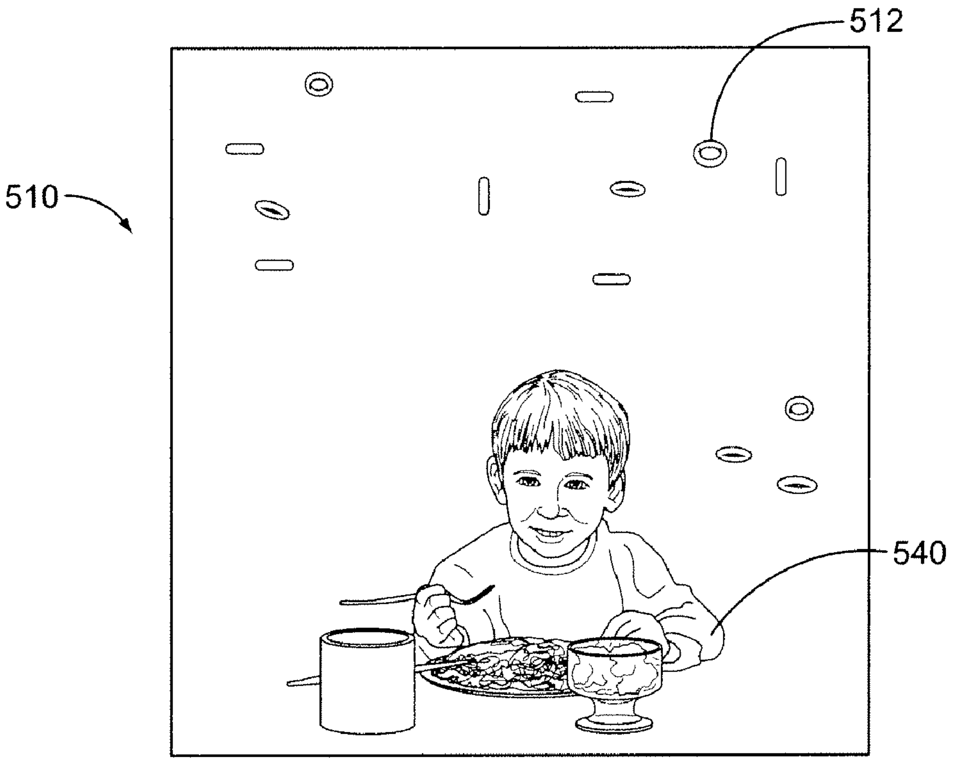
FIGS. 5A-C are a series of two-dimensional artistic works incorporating the symbols produced by the path of the circular objects.
Figure 5B:
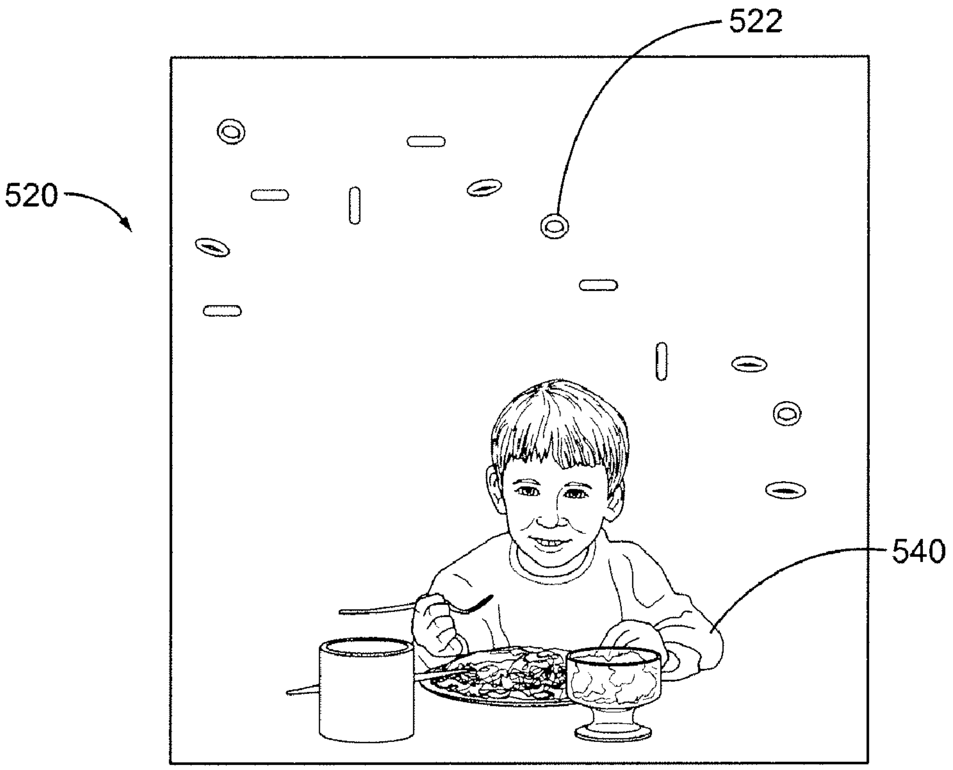
Figure 5C:
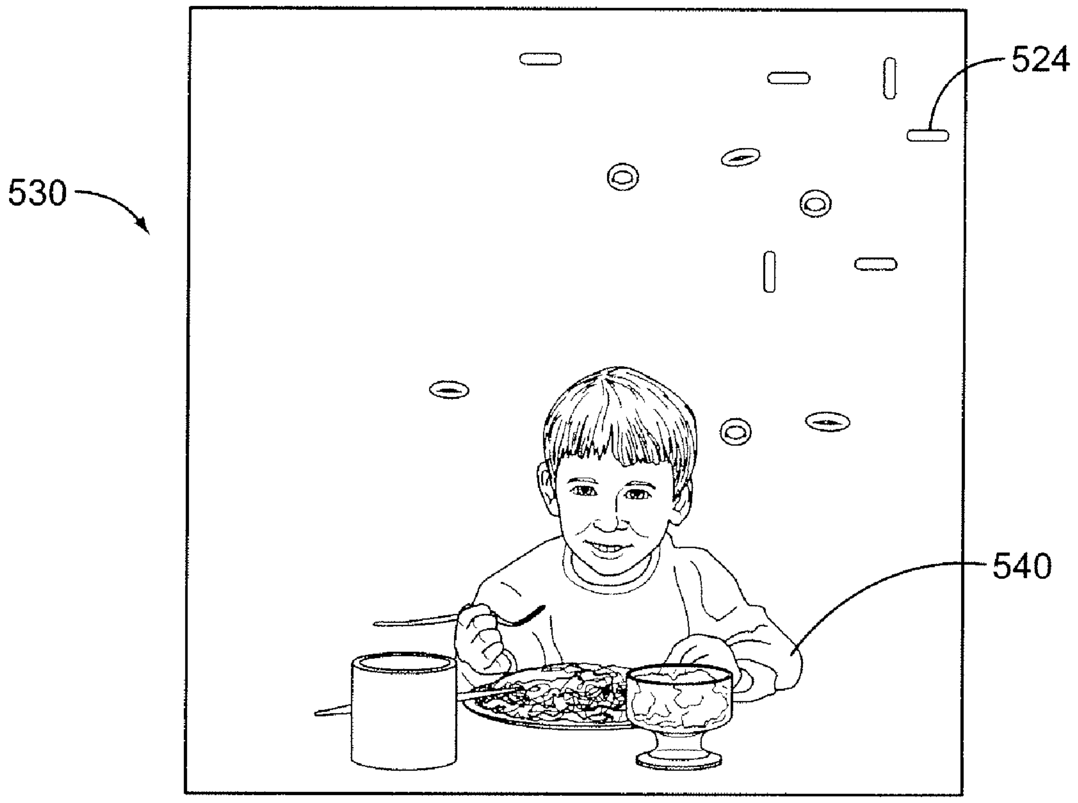

FIGS. 5A-5C shows a series of two-dimensional artistic works 510, 520 and 530 that incorporates the group of symbols shown in FIG. 1. Each of the artistic works 510, 520 and 530 are a print in this example, but other two-dimensional media such as paintings, drawings murals, etc. may be used. Each of the two-dimensional artistic works 510, 520 and 530 include a common still image 540. The symbols in each of the two-dimensional artistic works 510, 520 and 530 are derived from the collection of symbols in FIG. 1. The symbols of the collection of symbols varies between each of the artistic works 510, 520 and 530 making each unique but providing a common theme between the three works. For example, the artistic work 510 in FIG. 5A includes a set of symbols 512 that are derived from the collection of symbols in FIG. 1 and rendered relative to the static image 540. A different set of symbols 522 are rendered in relation to the static image 540 in the artistic work 520 in FIG. 5B that show a progression from the symbols 512 in FIG. 5A. A third different set of symbols 532 are rendered in relation to the static image 540 in the artistic work 530 in FIG. 5C that show a progression from the symbols 522 in FIG. 5B.

The two-dimensional works such as the artistic works 510, 520 and 530 may be drawings, paintings or two-dimensional works made through other mark-making technique on a surface, which use the collection of symbols to document the path and rotation of a circular object 102 as shown in FIG. 1. As previously stated, the collection of symbols create a progression indicating the movement between dual states. The symbols also indicate consecutive states, similar to what the viewer sees when viewing a comic strip. In each frame of a comic strip such as the different works in FIGS. 5A-5C, a change in movement is indicated. In each consecutive element, or frame, of a two-dimensional work using the symbol set, whether drawing, painting or other mark-making technique, there will be a change in how each symbol in the symbol set relates to the rest of the symbols or elements in another part of the two-dimensional work.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method for creating a three-dimensional artistic work having at least one flat surface and a ceiling area, comprising:
- mounting a wall with the flat surface;
- locating a grid from the ceiling area in a perpendicular plane relative to the flat surface;
- hanging a series of circular objects from the intersections of the grid in relation to the flat surface at different heights; and
- configuring each of the series of circular objects at a fixed rotational orientation according to a pattern of symbols based on the fixed rotational orientation of the circular objects relative to vertical and horizontal axes defined by the grid of the ceiling area, wherein the pattern of symbols represents the movement of a circular object, the pattern of symbols including a horizontal line symbol, a vertical line symbol, a zero symbol and a tilde symbol when viewed from a stationary position.

2. The method of claim 1, wherein the light source causes shadows of the circular objects to be shown on the flat surface.

3. The method of claim 1, further comprising providing a second flat surface in relative orientation to the first flat surface.

4. The method of claim 1, wherein the circular objects are of uniform size.

5. The method of claim 1, wherein the circular objects are constructed from paper, glass, metal or fiber.

6. The method of claim 1, wherein the circular objects are hung via wire attached to the ceiling.

7. The method of claim 1, wherein a two-dimensional artistic work is mounted on the flat surface.

* * * * *